JACKSON & JUDSON.
Annunciator.
No. 111. Reissued April 18, 1848.
Fig. 1,
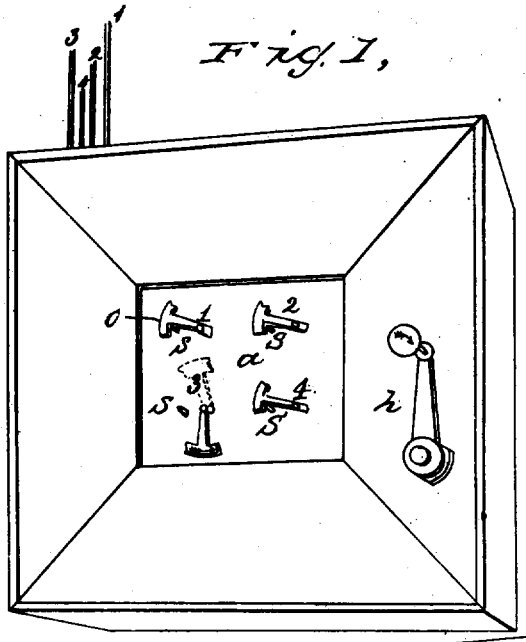
Fig. 4,
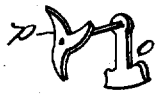
Fig. 3,
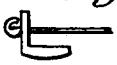
Fig. 2,
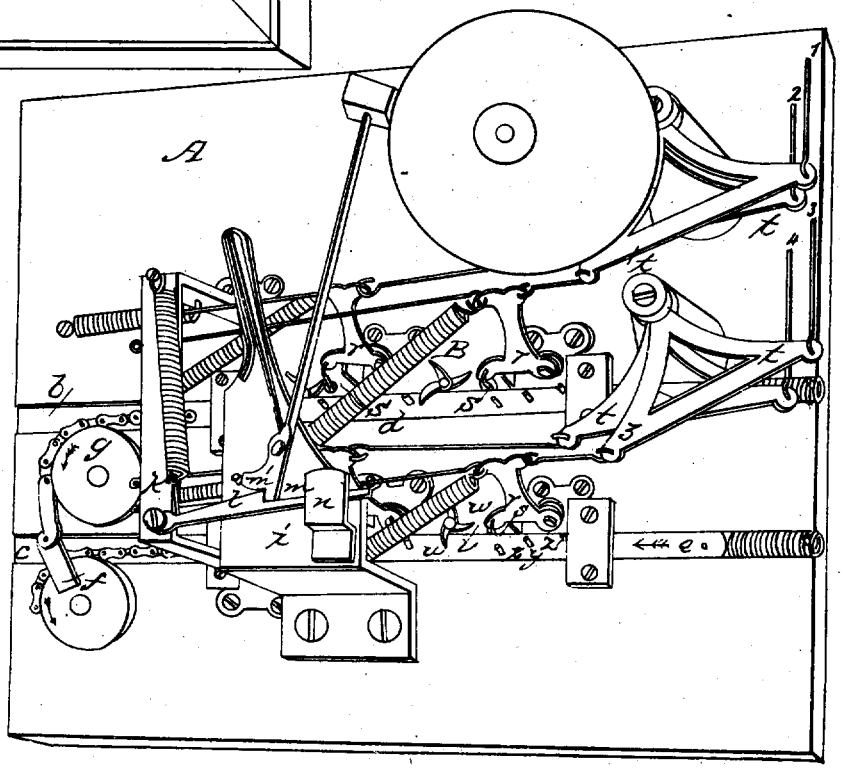

UNITED STATES PATENT OFFICE.

TIMOTHY D. JACKSON AND ALFRED JUDSON, OF ROCHESTER, ASSIGNORS TO J. V. D. WYCKOFF, OF NEW YORK, N. Y.

IMPROVEMENT IN BELL MACHINERY FOR HOTELS, &c.

Specification forming part of Letters Patent No. 4,816, dated October 17, 1846; Reissue No. 111, dated April 18, 1848.

*To all whom it may concern:*

Be it known that we, TIMOTHY DEMARCK JACKSON and ALFRED JUDSON, of the city of Rochester, county of Monroe, and State of New York, have invented a new and useful machine, which we entitle an "Annunciator," which is to be placed in the bar or some conspicuous place in hotels or other buildings where communication is required from the different apartments by means of a bell; and we do hereby declare that the following is a full and exact description of the same.

The nature of our invention consists in the construction of a signal-bell and annunciators combined for the purpose of indicating the place from whence the signals proceed, our invention having for its object an improvement in that branch of domestic arrangements for calling servants to the various apartments of a house when wanted. The modes in common and general use for this purpose consist of a bell-pull affixed to the wall of the apartment, having a wire attached, which leads from it to the kitchen or other place where the servants congregate, and there terminates by being connected with a bell. As many bells are hung upon the walls as there are rooms supplied with bell-pulls. In small houses there is usually nothing about the bells to indicate the apartments to which they are connected, other than their position—as first, second, third, &c.—in the rows, and the servants ascertain that the first bell is for the parlor, the second for the front bed-room on the second floor, &c., and they likewise become accustomed to the sound of the various bells, being few in number, and easily learn the room they are wanted in when a bell is sounded. In hotels and other large edifices the same system prevails with regard to the manner of connecting the bells with the various apartments; but as their number is usually very considerable, some method of ascertaining the rooms from whence the bells are from time to time rung must be resorted to other than that before noted of either sound or position. To do this, the rooms of the buildings are numbered and the same numbers are painted on the walls of the room containing the rows of bells, so that each bell shall be distinguished by its number, and that number shall correspond with the room to which the bell is connected. In a hotel, also, these bells are not usually put in the kitchen, but are suspended under the cornice on the walls of the clerk's office, and exhibit a very unsightly appearance, and are likewise a subject of annoyance to the boarders from the fact that that room is generally their common resort, being frequently the reading-room and parlor of the gentlemen. This mode of signals has proved very uncertain and vexatious. The sound of the bell calls the attention; but it must be seen before it can be ascertained from what room the alarm was made. If the attendants are not near enough to do so, the ability to answer the call is lost, and they must wait until it is repeated. It also often happens that the sound or motion of the one bell rung will put in vibration the clappers of several near it; or the wires become entangled, and thus make confusion in the signals.

To obviate these several defects is the object of our invention. In the first place, we leave all the bell-pulls and wire leaders as they now are, but dispense with all the bells save one, and it is upon this one bell that all the signals made in the various departments are sounded. By means of mechanism to be hereinafter explained (which mechanism, as well as the bell, is concealed from view, being contained within a handsomely-ornamented case) the moment an alarm is given by sounding the bell a permanent signal is made, which indicates or announces the number of the room from whence it came. After the call is answered the attendant restores the indicator to its first position.

The external view of the case containing the machinery of our invention will be seen in Figure 1 of the annexed drawings. It consists of a square or oblong box of sufficient depth and capacity to hold the parts designed to be contained within it, and it may be decorated with carvings and ornaments to any extent desired. Near the center will be seen a face or register having several numbers painted upon it—as 1 2 3 4—which indicate rooms named with corresponding figures. As the whole principle is embraced in a movement requisite to indicate a single number, a second number requires only a duplicate part to be added to indicate a second, and so on. Thus the four numbers represented as operated by this machine consist simply in repetitions of the first, and the numbers may be still further continued until the machine is enlarged to indicate the signals made from a hundred or five hundred rooms, or more, as may be wanted. The number of the room is announced or indicated by means of pieces of metal which are movable and operated by the mechanism in the interior of the case, and the indication of the number is effected by changing the position of said pieces on the dial-plate when an alarm is sounded. Thus the different position of the piece of metal, or, as we call it, the "drop," seen at No. 3 announces that the sound of the bell just heard was produced by persons in room No. 3. After the call has been answered the drop is restored to the position seen in 1 2 4, which movement, together with the detailed construction and operation of our machine, we shall now describe.

In Fig. 2 a view of the machinery is given which is contained within the case, and is represented as having all the various parts attached to and working upon a plane surface composed of an oblong square board, A, of wood, but may be made of metal or other suitable material. The appearance of the reverse side of A is seen at *a*, Fig. 1, drawn on a reduced scale.

In the board A two narrow rectangular grooves, *b c*, are cut horizontally, and extend from end to end. Into these grooves two brass slides, *d* and *e*, are fitted, but not so tight as to prevent them from being able to slide freely when they are moved. They have also several projecting pins in them, the position and office of which we shall describe in another place. The movement of the slides is vibratory in the grooves. They likewise move in unison, so that when one moves the other is also put in motion. This is effected by the pulleys and chains *f g*, seen attached. The pulley *f* has its center fixed upon a pin, which passes through A and projects from the reverse side, and terminates in a crank-handle, *h*, Fig. 1. By passing the handle down in the direction of the arrows the chains are drawn over the pulleys *f g*, and thus give motion to the slides. The slides are restored to their first position by recoil-springs placed at their opposite ends, as seen in the drawings.

At *i* is seen a metallic standard screwed firmly upon A, and bent and shaped as seen in the figure. This standard is for the purpose of supporting a hammer to strike the bell. Near this standard there is a metal crank, K, hung vertically upon A, the arms being long enough to project the face *k* out on a line with the standard *i*. By means of this crank and the connections upon it the bell is made to sound for all the various rooms attached to the machine.

The sound made upon the bell is produced by single and distinct blows of the hammer, and is effected by the crank K and the trip-lever *l*. This last consists of a piece of metal having a notch cut upon it at *l*, so that it will fit in one adapted to it upon the extremity of the hammer-handle at *m*, and is hinged at one end to the crank K, the opposite end continuing past *m*, and is kept in position by a guard, *n*. The lever *l* has a vibrating motion, and is held up by a spiral spring hung upon K, as represented. When the lever *l* is thrust forward, the hammer-handle is carried with it, by means of its connection at *m*, a sufficient distance to give effect to the blow of the hammer-head when it strikes the bell upon its recoil. The hammer-head having arrived at the proper point, the handle is disengaged from the notch in the lever *l* by means of the projecting point *m'*. This comes down and presses upon *l* by reason of the circular motion of the hammer-handle, and finally forces *l* out of the notch *m*, and the hammer is thrown against the bell by the force of the spring seen in the figure. When the crank K returns to its position, the lever *l* also resumes its place in the notch *m*, and would reproduce the blow upon the bell by acting upon the crank K, as before described.

Through the face of the plate A there are several small holes bored along the line of the slides *d* and *e*. The first four of these are for the pivots which connect the drops and tumblers together. The second four, which are bored near the first, are for the support of rest-pins for the drops. The drop consists of a piece of metal shaped as seen at *o*, Fig. 4, and *p* is the tumbler, made also of a piece of metal having an eye in the center, from which three points diverge, and is otherwise shaped as represented in the aforesaid Fig. 4.

The position the drops and tumblers have in the machine is seen by examining Figs. 1 and 2, one of these being required for every figure indicated on the face *a*.

The next thing in connection with the drop and tumbler is the drop-levers. At *r* is seen a strip of metal hinged at one corner to the plate A, and projects horizontally from it. At the opposite corner of the end to which it is hinged the rest-pin *s*, before named, is connected, the point of which passes through one of the holes in A prepared for it, and projects a little beyond the face side, as seen at *s s s s*, Fig. 1. The use of the pin is to sustain the drop in a horizontal position, as is evident from examining those seen at 1 2 4, Fig. 1. The projecting end of the drop-lever *r* widens a little so as to have room for two holes to be made in it. The first hole connects with one of the bell-cranks, and the second connects with the striking-crank K and a barrel-spring.

The letters *t* are four bell-cranks of the ordinary construction. At one end they are attached to the drop-levers *r*, and at the other the wires are fastened which lead to the various rooms of the house.

In pulling a wire attached to one of the cranks *t* a set of movements are performed which result in producing a sound upon the bell, and in indicating the number of the wire pulled by changing the position of some of the parts acted upon. The pulling therefore of a single wire—as, say, wire No. 3, Fig. 2—will show the whole principle of the machine. All the other parts shown in drawings are duplicates, and drawn to illustrate the method of operating and connecting a large number of rooms.

When one of the wires which leads off from the machine to the room is pulled, the crank *t* is first effected. From that motion is communicated to the drop-lever *r*, which causes the rest-pin *s* to be drawn back, so that the point which supports the drop *o* will be removed from under it, when it immediately falls from a horizontal to a vertical position, as seen at 3, Fig. 1. The drop-lever then gives motion to the striking-crank K, which makes the lever *l* advance upon the bell-handle, and rings the alarm, as before described.

It will be seen that all the wires leading from one side of the drop-levers *r* terminate upon the striking-crank K; but the wires are so fastened to it that the movement of one effects no change in the position of the others. The side of the crank K is perforated with a sufficient number of holes for the wires, the ends of which, after they are put through, are turned in a loop on the opposite side, as seen in Fig. 3. The crank therefore, when moved by the pulling of one wire, does not effect the rest, because they do not act upon the crank, except in the pulling direction, and slip along through the holes they are in as the crank moves.

The movements produced by the pulling of wire No. 3—the manner in which the drops are made to fall—were described. We shall now describe the manner in which they are to be restored to their original position. At *u v w* is seen the position of the tumbler when the drop hangs vertical or has been let down. The operator, taking hold of the handle *h*, turns it down in the direction of the arrow. This movement, as before described, affects the slides *d e* through the chains and pulleys *f g*. It will be seen that there are a set of three pins in the slides to each tumbler, and, as represented, are beneath the drop-levers *r*. By the movement of the slides these pins advance toward the tumbler; but they can only act upon such tumblers as have the drops to which they are attached down, as seen at *u v w*. The pin *x* first comes against the tumbler and strikes the point *u*. This brings the next point, *v*, round and down, so that the second pin, *y*, will act against it. The slide, advancing, carries *v* on until the point *w* comes round. *w* now locks in pin *z*, *w* having the position that *u* first had. Thus the tumbler will have carried the drop from the position seen in No. 3, Fig. 1, half round, so that it will be vertical, with the head upward, being moved in the direction of the arrow drawn on it. The pin *z* carries the point of the tumbler *w* so far that the drop is carried beyond the perpendicular, as seen in the dotted lines in Fig. 1, when it immediately falls by its own gravity upon the rest-pin *s* as the drops 1 2 4 are represented, the tumbler *u v w* now having the position seen by that immediately above at B.

What we claim as our invention, and desire to secure by Letters Patent, is—

The combination and arrangement of the drops with the tumblers, drop-levers, and slides, substantially in the manner and for the purpose herein set forth.

T. D. JACKSON.
ALFRED JUDSON.

Witnesses:
P. G. BUCHANAN,
A. WENTWORTH.